United States Patent [19]
Raab

[11] Patent Number: 5,956,857
[45] Date of Patent: Sep. 28, 1999

[54] MOUNTING DEVICE FOR A COORDINATE MEASURING MACHINE

[75] Inventor: Simon Raab, Longwood, Fla.

[73] Assignee: Faro Technologies, Inc., Lake Mary, Fla.

[21] Appl. No.: 08/858,684

[22] Filed: May 19, 1997

[51] Int. Cl.[6] .................................................. G01B 5/008
[52] U.S. Cl. .............................................. 33/503; 33/1 M
[58] Field of Search ...................................... 33/503, 1 M

[56] References Cited

U.S. PATENT DOCUMENTS

| | | | |
|---|---|---|---|
| 3,377,713 | 4/1968 | Schiler | 33/503 |
| 4,961,267 | 10/1990 | Herzog | 33/503 |
| 5,148,377 | 9/1992 | McDonald | 33/503 |

*Primary Examiner*—Christopher W. Fulton
*Attorney, Agent, or Firm*—Cantor Colburn LLP

[57] ABSTRACT

A coordinate measuring system having a quick disconnect is disclosed. The coordinate measuring system includes a multijointed arm having a first end and a plurality of transfer housings for generating signals indicating the position of the first end. A first locking device is mountable to a second end of the arm. The first locking device has a first surface which is removably received within a first opening in a housing. The housing is mountable to a support and includes a second opening for communicating with the first opening. A second locking device having a second surface is movably received within the second opening from an unlocked position to a locked position and constitutes a cam which rotates to engage the first locking device. The second surface engages the first surface in the locked position to prevent the first locking member from being removed from the first opening. The first and second surfaces are not engaged in the unlocked position so that the first locking member can be removed from the first opening. Multiple sets of first and second locking devices are disclosed.

9 Claims, 10 Drawing Sheets

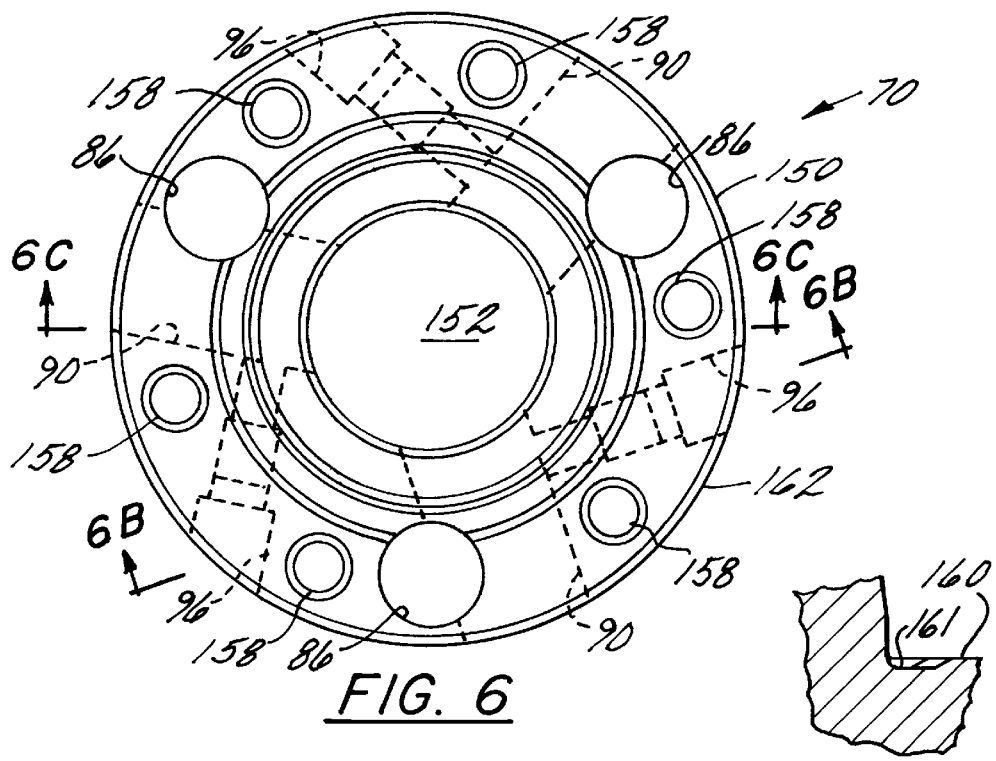
FIG. 6
FIG. 6D
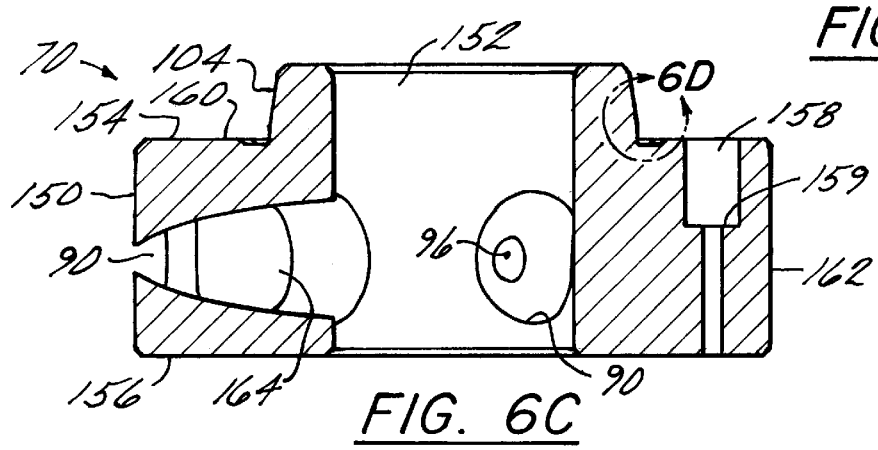
FIG. 6C
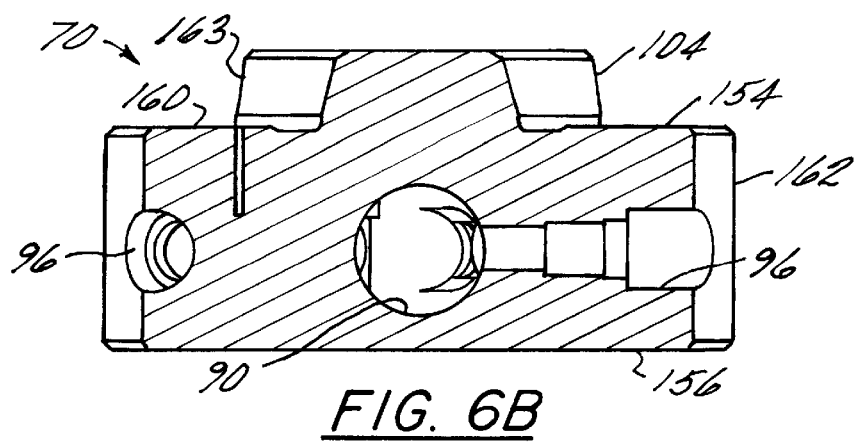
FIG. 6B

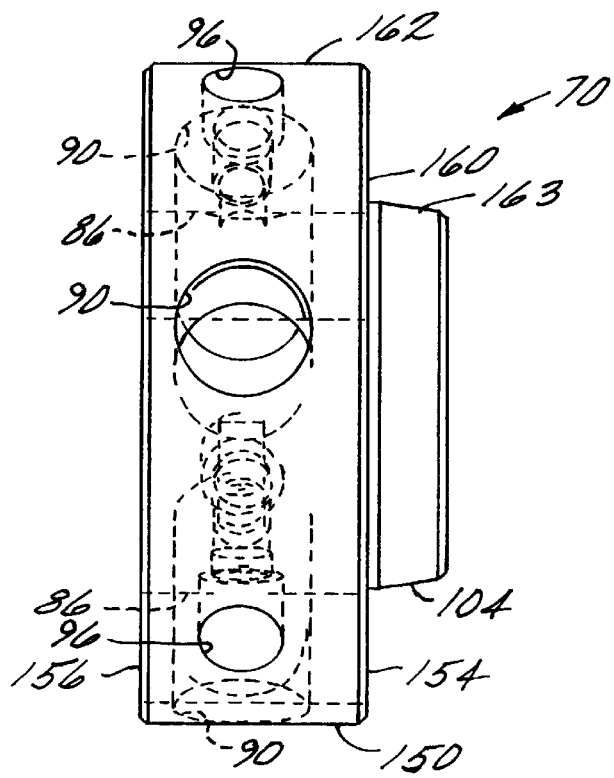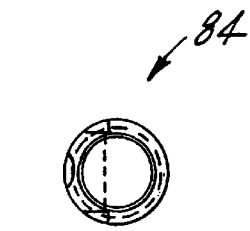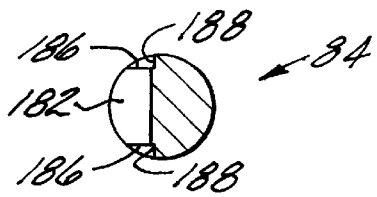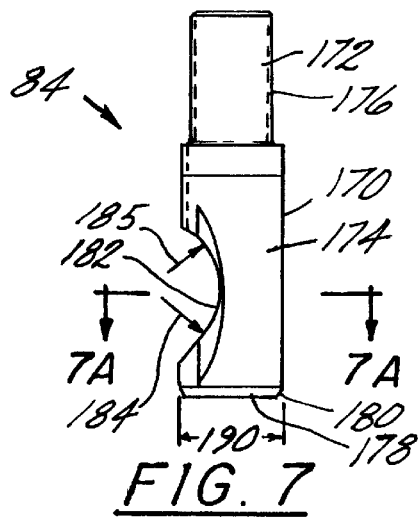

MOUNTING DEVICE FOR A COORDINATE MEASURING MACHINE

BACKGROUND OF THE INVENTION

1. Field of the Invention

This invention relates generally to three dimensional coordinate measuring machines (or CMM's). More particularly, this invention relates to a new and improved mounting device for a three dimensional CMM having a multijointed arm which allows for quick changes in the location of the arm with a high degree of dimensional repeatability.

2. Prior Art

It will be appreciated that everything in the physical world occupies volume or space. Position in a space may be defined by length, width and height which, in engineering terms, is often called an X, Y, Z coordinate. The X, Y, Z numbers represent the dimensions of length, width and height or three dimensions. Three-dimensional objects are described in terms of position and orientation; that is, not just where an object is but in what direction it points. The orientation of an object in space can be defined by the position of three points on the object. Orientation can also be described by the angles of alignment of the object in space. The X, Y, and Z coordinates can be most simply measured by three linear scales. In other words, if you lay a scale along the length, width and height of a space, you can measure the position of a point in the space.

Presently, coordinate measurement machines or CMM's measure objects in a space using three linear scales. FARO Technologies, Inc. of Lake Mary, Fla. (the assignee of the present invention) has successfully produced a series of electrogoniometer-type digitizing devices for the medical field. In particular, FARO Technologies, Inc. has produced systems for skeletal analysis known as METRECOM® and systems for use in surgical applications known as SURGICOM™. Electrogoniometer-type devices of the type embodied in the METRECOM and SURGICOM systems are disclosed in U.S. Pat. Nos. 4,670,851, 5,251,127 and 5,305,203, all of which are assigned to the assignee hereof and incorporated herein by reference.

Portable CMM's are now used for three dimensional measurement of objects for reverse engineering, inspection, etc. An exemplary portable CMM system is disclosed in U.S. Pat. No. 5,402,582 assigned to the assignee of the present application, and which is incorporated herein by reference. As shown in prior art FIG. 1, the three dimensional measuring system of U.S. Pat. No. 5,402,582 generally comprises a coordinate measuring machine (CMM) 10 comprised of a manually operated multijointed arm 12 and a support base or post 14, a controller or serial box 16 and a host computer 18. It will be appreciated that CMM 10 electronically communicates with serial box 16 which, in turn, electronically communicates with host computer 18.

CMM 10 includes transducers (e.g., one transducer for each degree of freedom) which gather rotational positioning data and forward this basic data to serial box 16. Serial box 16 provides a reduction in the overall requirements of host computer 18 to handle certain complex calculations and provides certain preliminary data manipulations. The serial box 16 includes EEPROMS which store data control software, a microcomputer processor which manipulates data, a signal processing board for communicating data and a number of indicator lights 20. As mentioned, basic transducer data is sent from CMM 10 to serial box 16. Serial box 16 then processes the raw transducer data on an ongoing basis and responds to the queries of the host computer with the desired three-dimensional positional or orientational information.

As shown in prior art FIG. 2, the CMM 10 comprises a base 14 connected to a first set of two transfer housings including a first transfer housing 40 which, in turn, is connected to a second transfer housing 42 (positioned transverse to housing 40). A first extension member 44 is rigidly attached to a second set of two transfer housings including a third transfer housing 46 transversely attached to a fourth transfer housing 48. First extension member 44 is positioned perpendicularly between transfer housings 42 and 46. A second extension member 50 is aligned with and rigidly attached to transfer housing 48. Rigid extension member 50 is rigidly attached to a third set of two transfer housings including a fifth transfer housing 52 transversely attached to a sixth transfer housing 54. Fifth transfer housing 54 has attached thereto a handle/probe assembly 56 at the end of the multijointed arm. Additional details of the CMM 10 are disclosed in U.S. Pat. No. 5,402,582 which is incorporated herein by reference.

While the CMM systems of the prior art are well suited for their intended purposes, there are, however, drawbacks to the prior art with respect to the mounting system to affix arm 12 on its support, e.g., portable stand, table, wall, fixture, jig, ceiling, etc. There is often a need to change the location of a CMM system for a new process or use of the system. Changes in location may be include changes in physical location or orientation for a new use or process. The prior art mounting system, not shown in prior art FIG. 1 or 2, utilizes a six hole mounting plate attached to arm 12 and six bolts for securing the mounting plate to various adaptors. The deficiency of this design is that the six bolts are time consuming to install and in the event arm 12 is mounted overhead or on the side of a wall, significant effort is required to hold arm 12 in position while the bolts are being bolted into position. It is also advantageous that changes in location afford a high degree of dimensional repeatability so that the need to set up a new coordinate system after the moving the arm is substantially reduced or eliminated. Though the prior art provides a high degree of dimensional repeatability due to the number of bolts referencing the mounting plate, installation using the bolts is both cumbersome and time consuming. Thus there is a need in the industry for a mounting system which allows for quick changes in the location of the CMM with a high degree of dimensional repeatability.

SUMMARY OF THE INVENTION

The above-discussed and other drawbacks and deficiencies of the prior art are overcome or alleviated by the coordinate measuring system of the present invention. In accordance with the present invention, a coordinate measuring system having a quick disconnect is disclosed. The coordinate measuring system includes a multijointed arm having a first end and a plurality of transfer housings for generating signals indicating the position of the first end. A first locking device is mountable to a second end of the arm and depends therefrom when mounted. The first locking device has a first surface which is removably received within a first opening in a housing. The housing is mountable to a support and includes a second opening for communicating with the first opening. A second locking device having a second surface is movably received within the second opening from an unlocked position to a locked position and constitutes a cam which rotates to engage the first locking device. The second surface engages the first surface in the locked position to prevent the first locking member from being removed from the first opening. The first and second surfaces are not engaged in the unlocked position so that the first locking member can be removed from the first opening. Multiple sets of first and second locking devices are disclosed.

For attachment of the arm to the housing (and support), the first locking devices are inserted in corresponding first openings which are uniformly spaced in the housing where they are engaged by the cams which rotate to provide a locked and engaged position. The cams have square passageways to accommodate a tool to quickly rotate the cams from respective locked positions and unlocked positions.

The above description and other features and advantages of the present invention will be appreciated and understood by those skilled in the art from the following description.

BRIEF DESCRIPTION OF THE DRAWINGS

Referring now to the drawings wherein like elements are numbered alike in the several FIGURES:

FIG. 6 is a top view of a lower housing of the mounting device of FIG. 3 in accordance with the present invention;

FIG. 6A is a left end view of the lower housing of FIG. 6;

FIG. 6B is a sectional view of the lower housing of FIG. 6 take along line 6B—6B;

FIG. 6C is a sectional view of the lower housing of FIG. 6 take along line 6C—6C;

FIG. 6D is a sectional view of the lower housing of FIG. 6 take along line 6D—6D;

FIG. 7 is a front view of a cam lock pin of the mounting device of FIG. 3 in accordance with the present invention;

FIG. 7A is a sectional view of the cam lock pin of FIG. 7 taken along line 7A—7A;

FIG. 7B is a left end view of the cam lock pin of FIG. 7;

DETAILED DESCRIPTION OF THE PREFERRED EMBODIMENT

Figure 1:
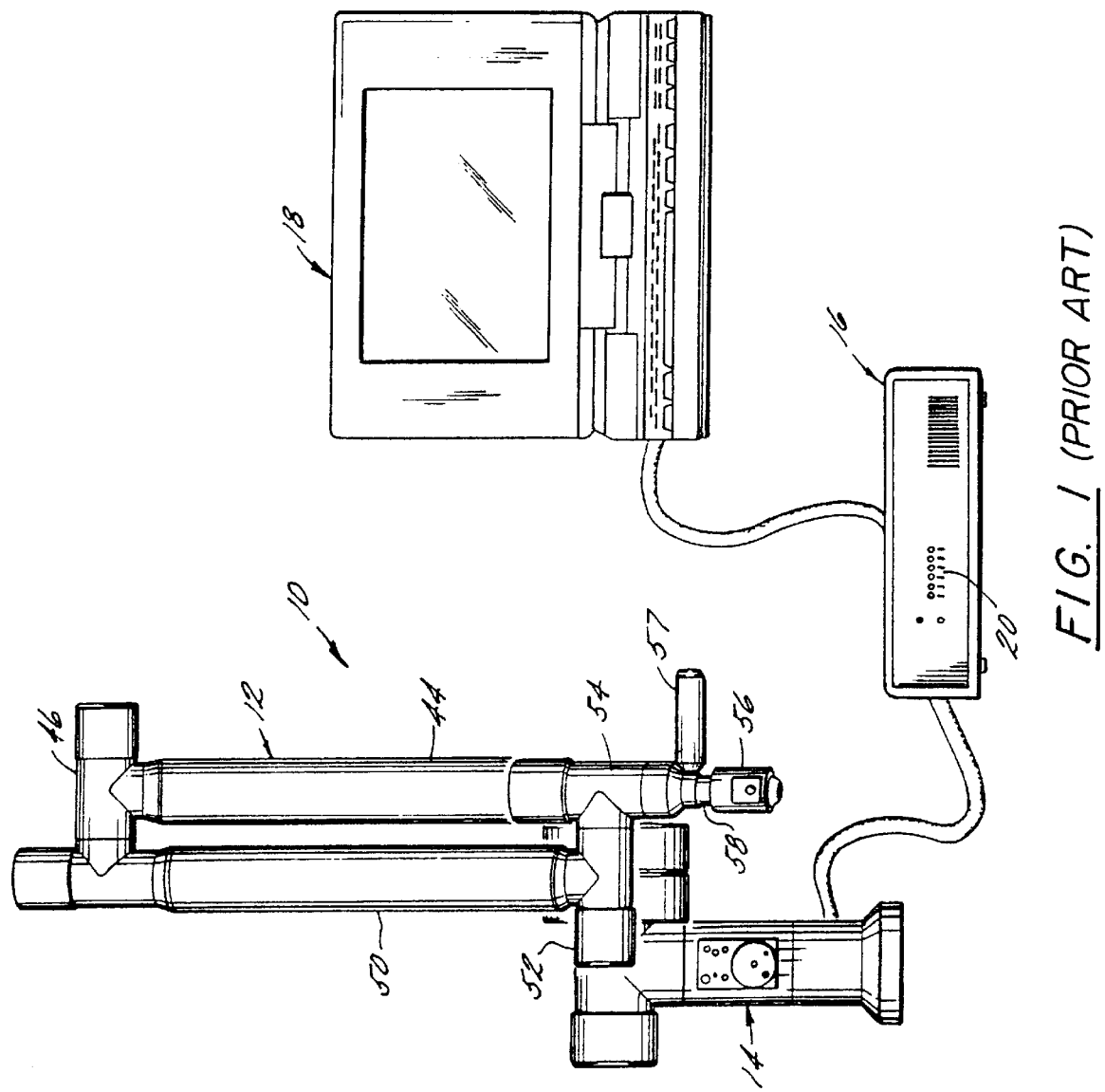
FIG. 1 is a front diagrammatic view depicting a conventional three dimensional measuring system including a coordinate measuring machine, a controller box and a host computer in accordance with the prior art.
Figure 2:
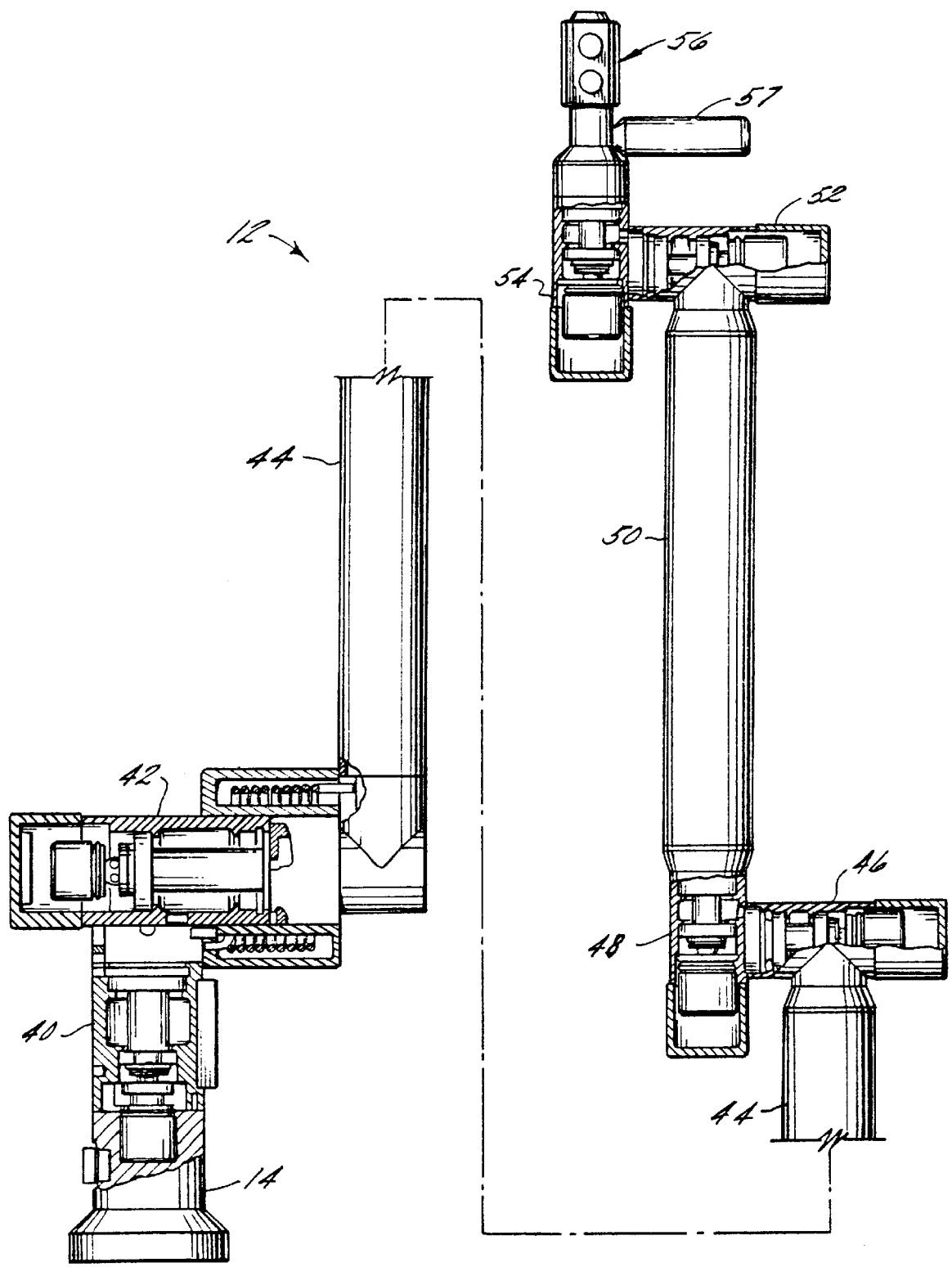
FIG. 2 is a longitudinal view, partly in cross-section of the CMM system of FIG. 1 in accordance with the prior art.
Figure 3:
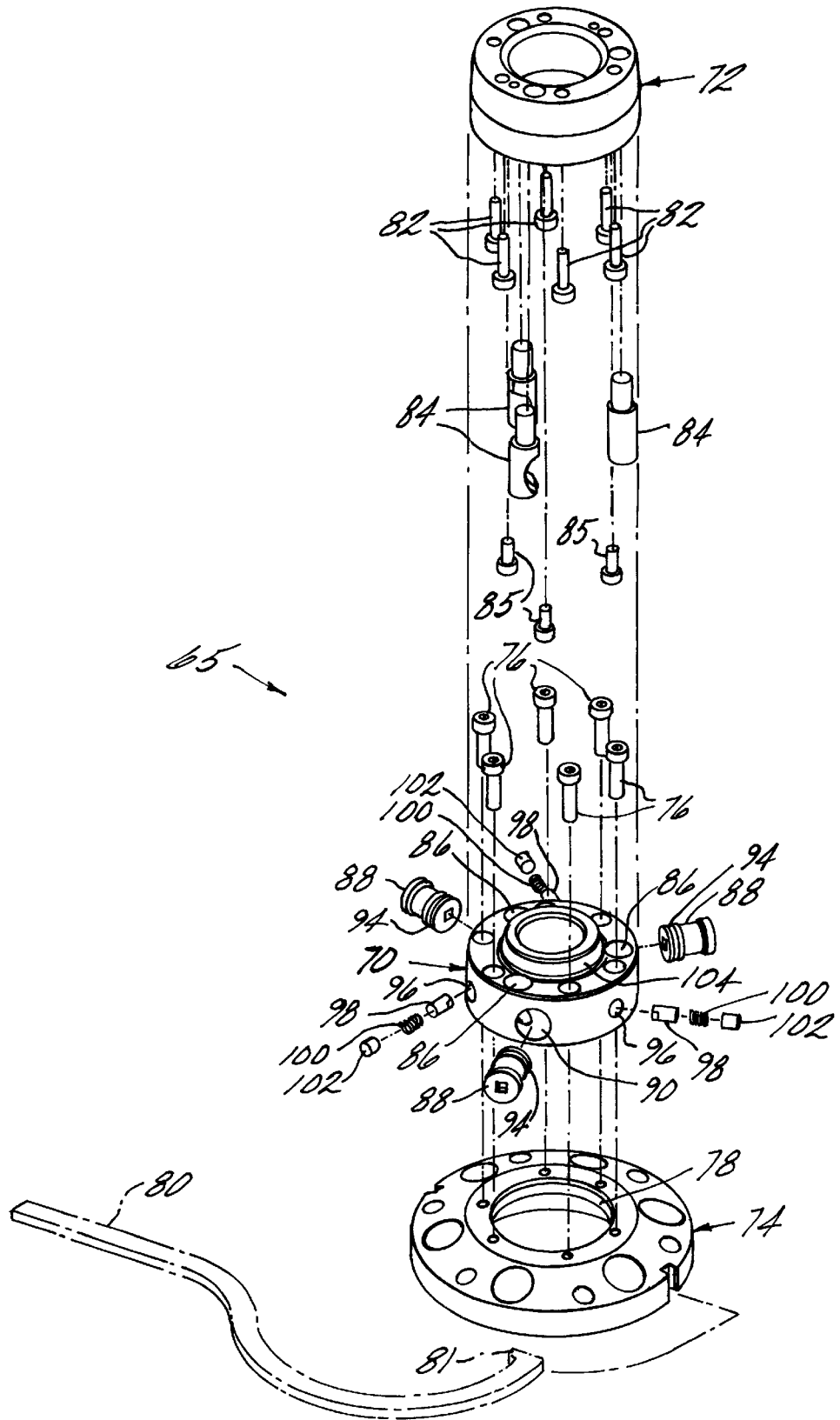
FIG. 3 is an exploded assembly view of a mounting device in accordance with the present invention.
Figure 8C:
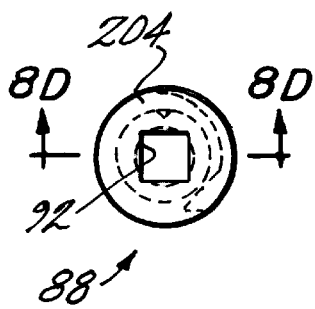
FIG. 8C is a left side view of the cam of FIG. 8.
Figure 8A:
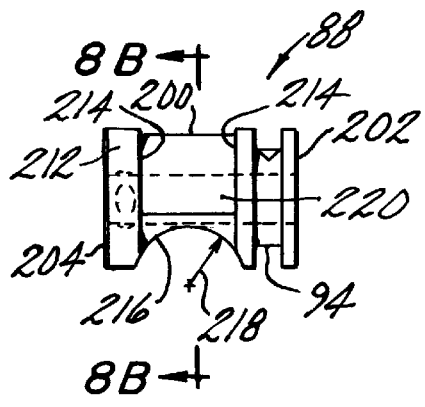
FIG. 8A is a front view of the cam of FIG. 8.
Figure 9A:
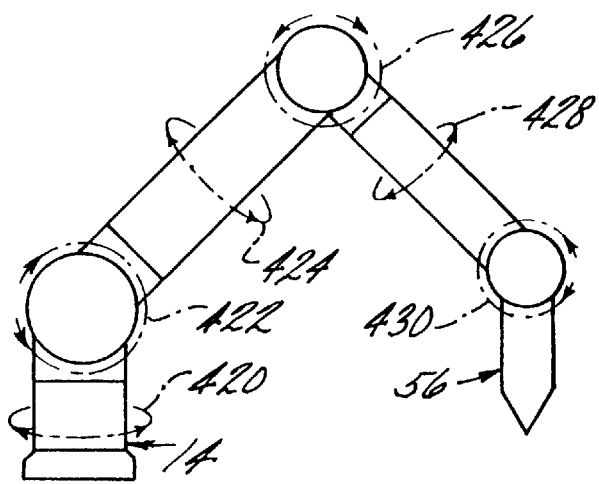
FIG. 9A is a prior art diagrammatic front elevation view of a measuring arm having six degrees of freedom in a 2-2-2 configuration.
Figure 9B:
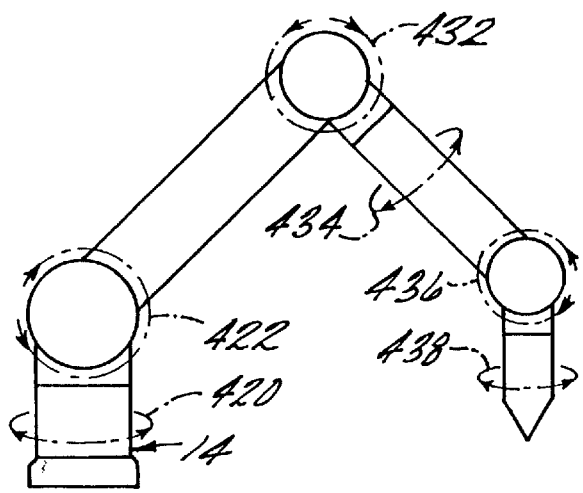
FIG. 9B is a prior art diagrammatic front elevation view of a measuring arm having six degrees of freedom in a 2-1-3 configuration.
Figure 9C:
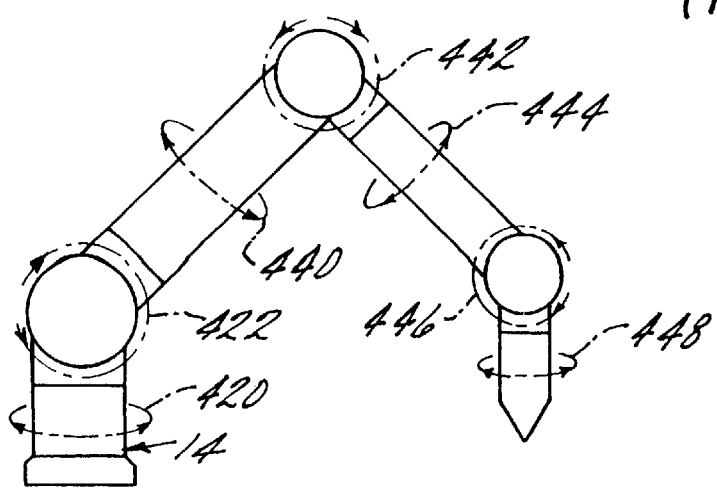
FIG. 9C is a prior art diagrammatic front elevation view of a measuring arm having seven degrees of freedom in a 2-2-3 configuration.

Referring now to FIG. 3, a mounting device in accordance with a preferred embodiment of the invention is generally shown at 65. Mounting device 65 includes a lower housing 70 mountable to a support, e.g., portable stand, table, wall, fixture, jig, ceiling, etc, and an upper housing 72 affixed to an arm (not shown) of a CMM system (such as arm 12 of FIG. 1). Referring also to prior art FIGS. 9A–9C, examples of three such basic arm configurations disclosed in pending U.S. patent application Ser. No. 08/398,592, which is incorporated herein by reference, are illustrated. Two of these arm configurations allow for six degrees of freedom. A third arm configuration allows for seven degrees of freedom. Each configuration has advantages for different functions and/or measuring conditions as dictated by the objects being measured or the function or operation being performed. Lower housing 70 and upper housing 72 are preferably cylindrically shaped and comprised of aluminum, though other shapes and materials may be employed. Lower housing 70 is attached to an adaptor plate 74 with bolts 76. Adaptor plate 74 has internal threads 78 for mounting adaptor plate 74 to a threaded pipe on a support, e.g., a stand, jig, table, fixture, etc. It will be appreciated, however, that lower housing 70 may be directly affixed to a support without adaptor plate 74 by a wide variety of methods, e.g. fasteners, clamps, welding, etc. Adaptor plate 74 is configured to receive a spanner wrench 80 for easy attachment to a support. Upper housing 72 is affixed to an arm by bolts 82, however, the precise method of affixing upper housing 72 to an arm may be varied, e.g. fasteners, clamps, welding, etc. Affixed to upper housing member 72 are three first locking devices in the form of cam lock pins 84. The cam lock pins 84 could also be directly affixed to an arm. Cam lock pins 84 are threadedly attached to upper housing 72 and rotate freely for reception in respective cam lock pin openings 86. Retaining bolts 85 are threadedly received in upper housing 72 adjacent to cam lock pins 84 to retain cam lock pins in upper housing 72 while affording slight rotational movement of cam lock pins 84 to enable ease of reception into cam lock pin openings 86. Cam lock pins 84 align upper housing 72 with lower housing 70. Three second locking devices in the form of cams 88 are received in respective cam guide openings 90. The geometries of cam lock pin openings 86 and cam guide openings 90 on lower housing 70 are so configured such that each cam lock pin 84 is brought into contact with a respective cam 88. The surface geometry of each cam 88 is matable with the surface geometry of each respective cam lock pin 84 so that by turning cam 88, respective surfaces of cam 88 mate with respective surfaces on cam lock pin 86 to provide a defeatable attachment between lower housing 70 and upper housing 72 as described in more detail below. Cams 88 include square passageways 92 to receive a tool (not shown) for urging the rotation of cams 88. Key guide openings 96 are defined in lower housing 70 for receiving keys 98. Keys 98 engage respective key grooves 94 to retain cams 88 in respective cam guide openings 90. Keys 98 are held in position with springs 100 and screws 102. Keys 98 further provide reference orientation to an operator by engaging respective cam detents 217 (FIGS. 8A and 8C) when respective cams 88 are rotated for removal or insertion of cam lock pins 84 in the unlocked position as more fully described below. Lower housing 70 includes a male tapered portion 104 which mates with a female tapered portion 106 (FIG. 4B) in upper housing 72. Cam lock pins 84, respective cam lock pin openings 86 and respective mating tapered portions 104 and 106 cooperate to provide a precise location (e.g. alignment) between lower housing 70 and upper housing 72. Thus, when the respective housings are affixed by the action of cams 88 against cam lock pins 84, there is a high degree of repeatability in the fixation in all planes of movement.

Figure 4A:
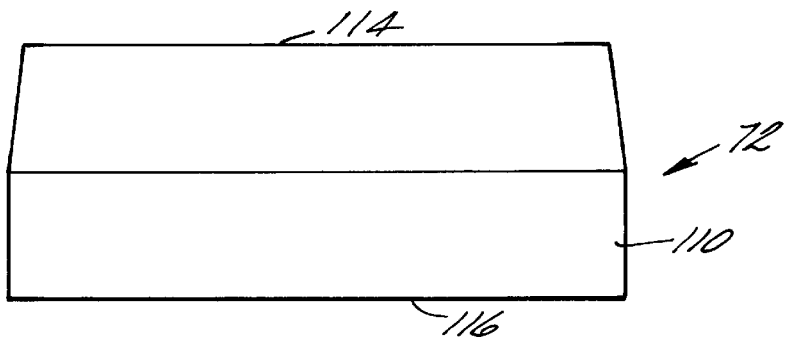
FIG. 4A is a left end view of the upper housing of FIG. 4.
Figure 4:
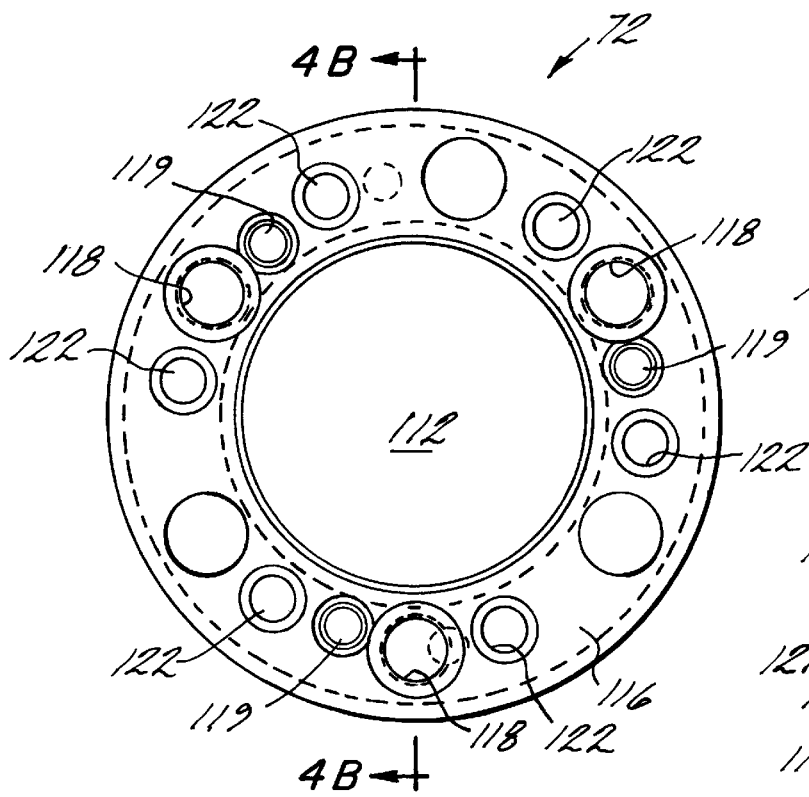
FIG. 4 is a bottom view of a upper housing of the mounting device of FIG. 3 in accordance with present invention.
Figure 4B:
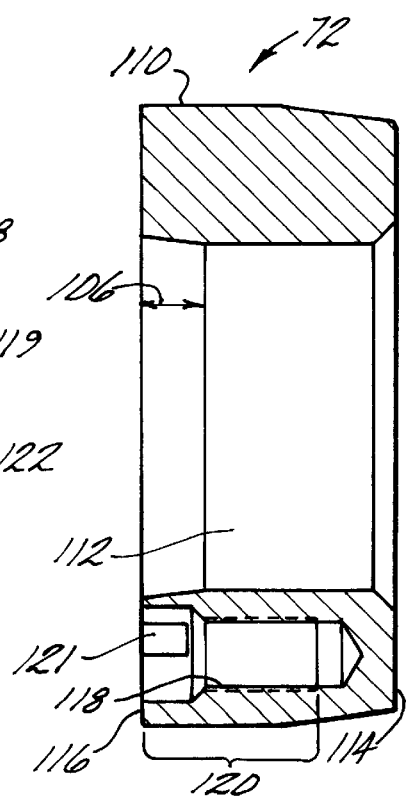
FIG. 4B is a sectional view of the upper housing of FIG. 4 taken along lines 4B—4B.
Figure 4C:
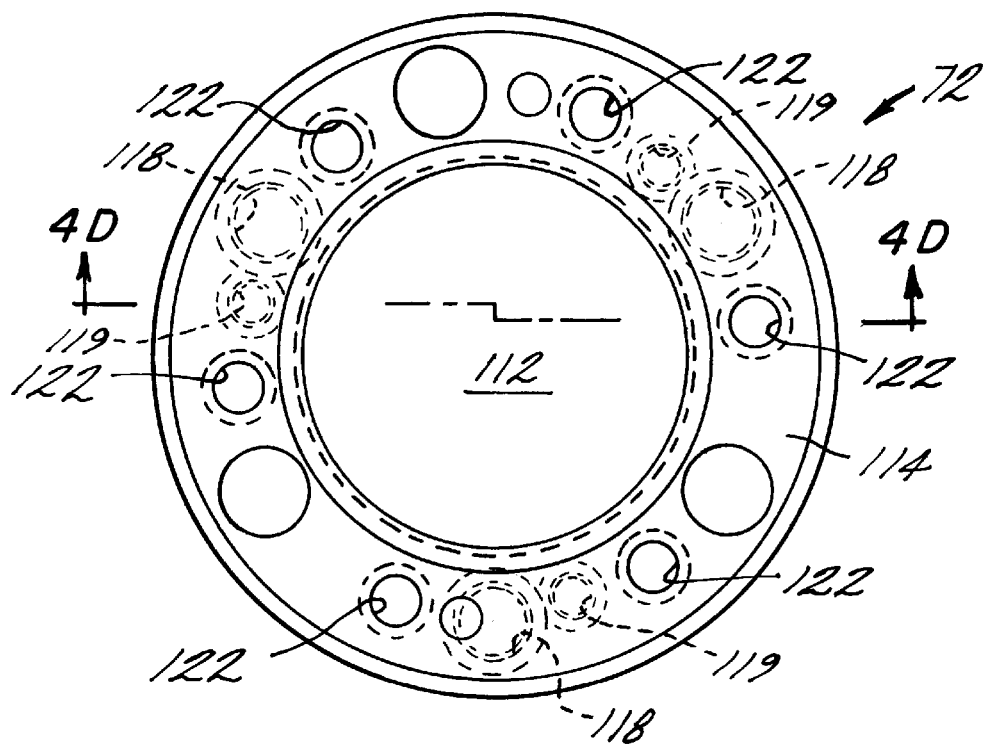
FIG. 4C is a top view of the upper housing of FIG. 4.

Now referring to FIGS. 4 and 4A–4E, upper housing 72 includes a generally cylindrically shaped body 110 having an upper surface 114 and a lower surface 116 with an opening 112 through about the center thereof. Preferably, housing 72 comprises aluminum. Other geometries and materials may be substituted. Threaded holes 118 are uniformly spaced on lower surface 116 and mate with corresponding threads on respective cam lock pins 84 to removably mount cam lock pins 84 to upper housing 72. Threaded holes 118 (e.g., three) are provided and are uniformly spaced along a predetermined radius from the center of upper housing 72. Retaining holes 119 threadedly receive retaining bolts 85 and are adjacent to each threaded hole 118. The placement of retaining bolts 85 into retaining holes 119 retains cam lock pins 84 on upper housing 72 by the convergence 121 of respective retaining holes 119 and threaded holes 118 so that cam lock pins 84 may rotate slightly for insertion in cam lock pin openings 86 but not unthread completely unless desired. To remove cam lock pins 84, a user first removes retaining bolts 85 and then unthreads cam lock pins 84 from threaded holes 118. It will be appreciated that the number of cam lock pins 84 may varied to practice the invention and that threaded holes 118 may be added or deleted as necessary. The precise geometric location of threaded holes 118 may be varied so long as their relative position allows for sufficient strength to support an arm when the respective housings are joined. Additionally, depth 120 of threaded holes 118 allows sufficient strength to support an arm when the respective housings are joined. Bolts 82 (FIG. 3) attach upper housing 72 to an arm through arm mounting holes 122. Arm mounting holes 122 are counter sunk 124 so that bolts 82 do not protrude beyond lower surface 116 when attached. In this manner, lower surface 116 of upper housing 72 and upper surface 160 of lower housing 70 rest flush against each other when respective housings are joined. Arm mounting holes 122 are preferably uniformly spaced along a predetermined radius from the center of upper housing 72. As shown in FIG. 4C, upper housing 72 includes female tapered portion 106 which receives male tapered portion 104 (FIG. 6B) of lower housing 70. Mating tapered portions 104 and 106 provide a precise location between lower housing 70 and upper housing 72 by the contact of male taper surface 163 of lower housing 70 and female taper surface 126 of upper housing 72. The contact of taper portions 104 and 106 in cooperation with the location of cam lock pins 84 in respective cam lock pin openings 86 provides a high degree of dimensional repeatability. It will be appreciated to that the precise geometry of upper housing 72 may be varied to practice the invention.

Figure 5:
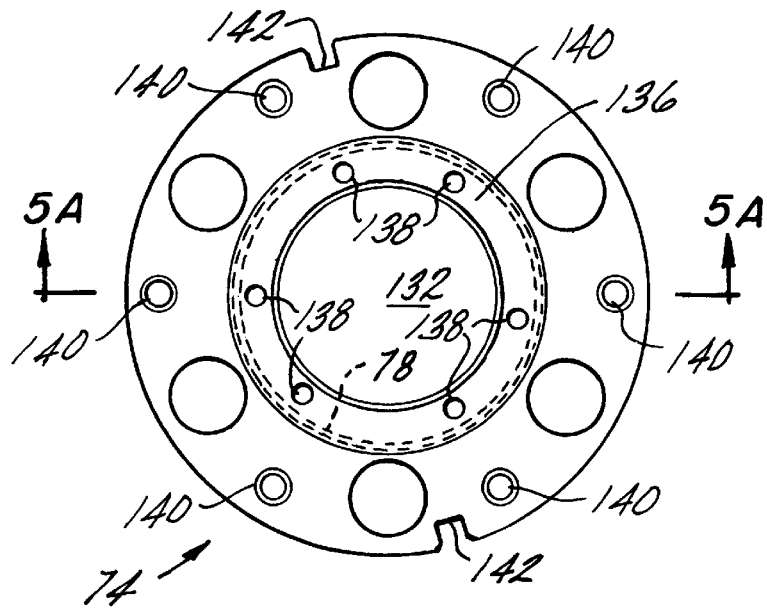
FIG. 5 is a top view on an adaptor plate of the mounting device of FIG. 3 in accordance with the present invention.
Figure 5A:
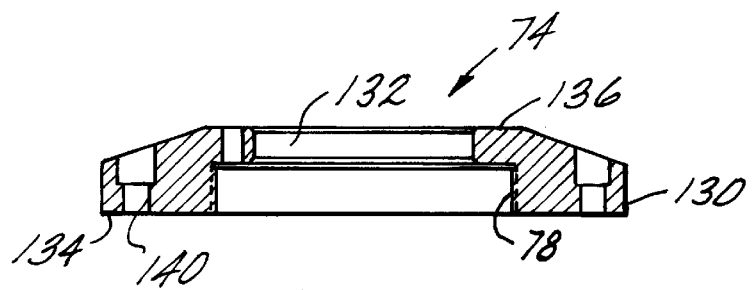
FIG. 5A is a sectional view of the adaptor plate of FIG. 5 taken along lines 5A—5A.
Figure 5B:
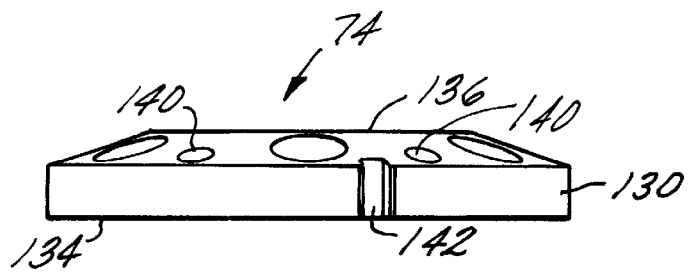
FIG. 5B is a left end view of the adaptor plate of FIG. 5.

Now turning to FIGS. 5, 5A–5B, adaptor 74 comprises a cylindrically shaped body 130 having a center opening 132 and two ends 134 and 136. Threaded holes 138 are provided on upper end 136 to receive bolts 76 to attach lower housing 70 (FIG. 3). Adaptor mounting holes 140, preferably counter-sunk, are included for mounting lower housing 70 to a support. Lower housing 70 further includes threads 78 for mounting adaptor plate 74 to a support having a threaded pipe. It will be appreciated that other suitable mechanisms may be employed to mount lower housing 70 to a support without the necessity of adaptor plate 74 to practice the invention. Adaptor plate 74 includes wrench keys 142 receptive to a corresponding prong 81 of a spanner wrench 80 (shown in FIG. 3). Thus in use, an operator of an arm of a CMM system may attach adaptor plate 74 by threadedly attaching it to a pipe previously attached to a support or may directly fasten it to the support.

Figure 4D:
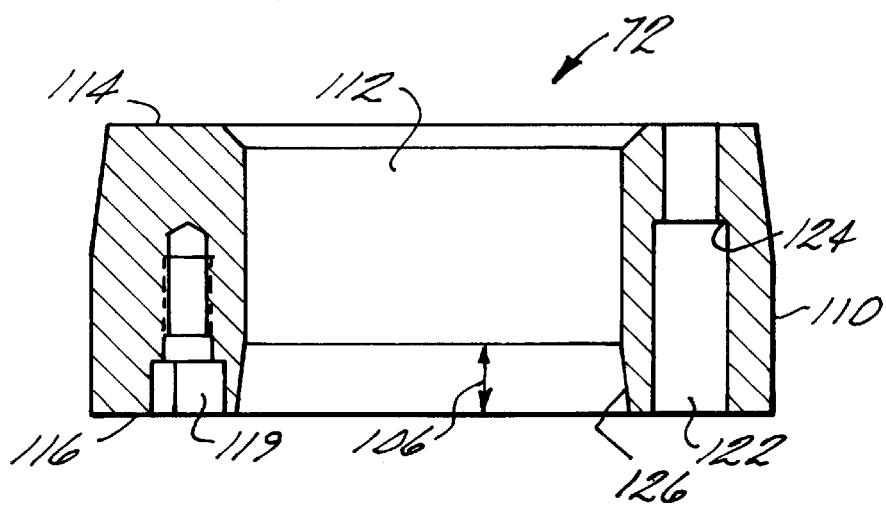
FIG. 4D is a sectional view of the upper housing of FIG. 4 taken along lines 4D—4D.

Referring now to FIGS. 6, 6A–6D, lower housing 70 includes a generally cylindrically shaped housing body 150 having an upper end 154 and a lower end 156 with an opening 152 through about the center thereof. Male tapered portion 104 extends upwardly from upper end 154 and includes relief 161 and male tapered surface 163 which is matable with female tapered surface 126 (FIGS. 4B and 4D). Lower housing mounting holes 158 are included for receiving bolts 76 to mount lower housing 70 to adaptor plate 74. Holes 158 are preferably countersunk 159 so that a surface 160 of upper end 154 mounts flush against lower surface 116 of upper housing 72. Cam lock pin openings 86 are positioned to receive respective cam lock pins 84 attached to upper housing 72. In this manner upper housing 72 is precisely aligned to lower housing 70 to provide a high degree of dimensional repeatability in addition to the mating male and female tapered portions 104 and 106. Cam guide openings 90 receive respective cams 88. The relative position of each cam guide opening 90 is preferably perpendicular to a respective cam lock pin opening 86 as shown in phantom in FIG. 6A. Cam guide openings 90 are uniformly positioned with respect to each other on side wall 162 of body 150. Each cam guide opening 90 partially intersects with a respective cam lock pin opening 86 to form an intersecting area 164. In this manner, as more fully described below, cam 88 can be turned from an unlocked position to a locked position with cam lock pin 84. In the unlocked position, the geometry of each cam 88 is such that each respective cam 88 and cam lock pin 84 disengage. In the locked position, the geometry of each respective cam 88 restricts the movement of cam lock pin 84 to provide a defeatable attachment between lower housing 70 and upper housing 72. Key guide holes 96 are positioned in body side 162 adjacent each cam guide opening 90 and intersect each cam guide opening 90 to receive respective keys 98. Keys 98 locate cam 88 within cam guide openings 90.

Figure 8:
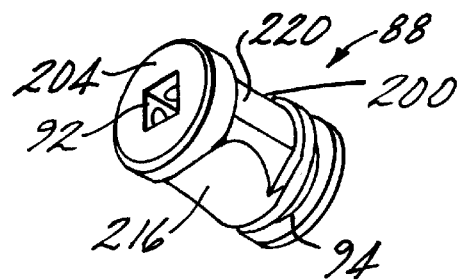
FIG. 8 is a perspective view of a cam of the mounting device of FIG. 3 in accordance with the present invention.

Now turning to FIG. 7, each cam lock pin 84 comprises a generally cylindrically shaped body 170 having an attachment portion 172 and an engagement portion 174. Attachment portion 174 includes threads 176 which mate with threaded holes 118 for mounting cam lock pins 84 to upper housing 72. In the preferred embodiment, each cam lock pin end 178 is slightly tapered 180 for ease of fit into respective cam lock pin openings 86 on lower housing 70. Engagement portion 174 of each cam lock pin 84 includes a locking curved surface 182. Locking curved surface 182 comprises two connected curved surfaces defined by predetermined radii of curvatures 184 and 185 which are complementary to cam surface 210 of cam engagement surface 220 of cam 88 (FIG. 8). Radius of curvature 184 is slightly larger than radius of curvature 185 and offset. Locking curved surface 182 includes referencing walls 186 and 188 formed along said surface as shown along line 7A—7A in FIG. 7A which mate with cam respective cam location walls 212 and 214 (FIG. 8). In this manner, cam 88 can be located precisely to locking curved surface 182. As shown in FIG. 8, cam 88 includes a cam concave surface 216 which has a radius 218 complimentary to the diameter 190 of engagement portion 178. Thus, in the unlocked position, cam 88 is turned so that cam concave surface 216 is aligned with and faces cam lock pin 84 and allows cam lock pin 84 to be easily removed from cam lock pin opening 86. If cam 88 is otherwise turned so that cam lock surface 220 at least partially opposes locking curved surface 182, the contact of cam lock surface 220 with locking curved surface 182 prevents cam lock pin 84 from being removed from cam lock pin opening 86 to constitute a locked position. It will be appreciated that when cam lock surface 220 directly opposed locking curved surface 182, there is greater contact between cam lock surface 220 and curved locking surface 182 and thus a stronger attachment is formed to constitute a fully locked position.

Figure 8B:
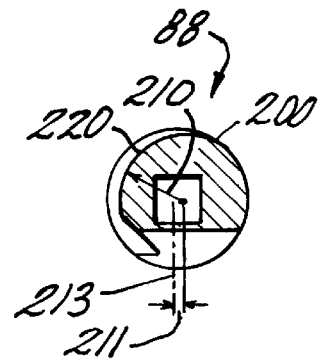
FIG. 8B is a cross sectional view of the cam of FIG. 8 taken along line 8B—8B.
Figure 8D:
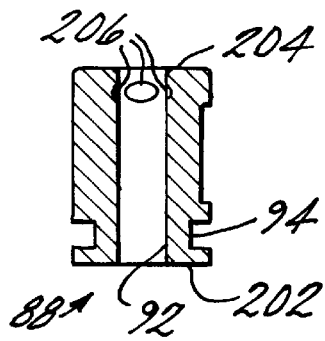
FIG. 8D is a cross sectional view of the cam of FIG. 8 taken along line 8D—8D.

Now referring to FIG. 8, each cam includes a generally cylindrically shaped body 200 having a first end 202 and a second end 204. End 202 is inserted into a respective cam guide opening 90 so that end 204 faces outward. A key groove 94 is included adjacent end 202 and mates with a respective key 98 to locate cam 88 within its respective cam guide opening 90. Cam 88 includes a cam concave surface 216 defined by a radius of curvature 218 which is complimentary to the diameter 190 of engagement portion 178 on cam lock pin 84. Radius 210 of cam lock surface 220 has a center of curvature and a slightly remote location 211 from the center 213 of cam 88 and compliments locking curved surface 182 of cam lock pin 84. As shown in FIG. 8B, location 211 of radius 210 causes cam lock surface 220 to progressively extend with respect to center 213 so that when cam 88 is turned to oppose said locking curved surface 182 of cam lock pin 84, cam lock surface 220 firmly engages locking curved surface 182 to prevent cam lock pin 84 from being removed from cam lock pin opening 86. Cam location walls 212 and 214 mate with cam lock pin location walls 186 and 188 to precisely locate cam 88 with respect to locking curved surface 182. Cam detent 217 is located along key groove 94 opposite cam concave surface 216 on each respective cam 88 and provides orientation to an operator as to the orientation of cam 88. As each respective cam 88 is rotated toward the unlocked position, detent 217 rotates until key 98 clicks into detent 217 (when concave surface 216 fully opposes cam lock pin 84 to constitute the unlocked position for removal and insertion of cam lock pin 84) to alert an operator. An operator can also feel respective key 98 click into detent 217. Squared passageway 92 having indents 206 is provided adjacent end 204 to receive a tool for turning cam 88. Thus, in the unlocked position, cam 88 is turned so that cam concave surface 216 is aligned with and faces cam lock pin 84 and allows cam lock pin 84 to be easily removed from cam lock pin opening 86. If cam 88 is otherwise turned so that cam lock surface 220 at least partially opposes locking curved surface 182, the contact of cam lock surface 220 with locking curved surface 182 prevents cam lock pin 84 from being removed from cam lock pin opening 86 to constitute a locked position. It will be appreciated that when the cam lock surface 220 directly opposed locking curved surface 182, there is greater contact between cam lock surface 220 and locking curved surface 182 and thus a stronger attachment is formed to constitute a fully locked position.

Thus in use, an operator may quickly change the location of an arm by inserting cam lock pins 84 in cam lock openings 86 and then turn cams 88 so that cam lock surfaces 220 engage locking curved surfaces 182 to provide a locked position. Conversely, an operator wishing to dismount an arm merely turns cams 88 so that cam concave surfaces 206 oppose respective locking curved surfaces 118 and removes cam lock pins 84 from cam lock pin openings 86 to remove the arm in the unlocked position.

While the preferred embodiments have been shown and described, various modifications and substitutions may be made thereto without departing from the spirit and scope of the invention. Accordingly, it is to be understood that the present invention has been described by way of illustration and not by limitation.

What is claimed:

1. A coordinate measuring arm comprising:

a multijointed arm having a first end, a second end and a plurality of transfer housings for generating signals indicative of position of said first end;

a first locking device attached at said second end of said arm; and a second locking device mountable to a support, said second locking device for engaging said first locking device in a locked position to prevent disengagement of said first and second locking devices and in an unlocked position to allow disengagement of said first and second locking devices; and a housing for coupling said second locking device to the support, said housing having a first opening for removably receiving said first locking device, said housing further having a second opening in communication with said first opening for movably receiving said second locking device therein to engage said first and second locking devices in said locked and unlocked positions.

2. A coordinate measuring arm as claimed in claim 1, wherein:

said first locking device includes a first surface;

said second locking device comprises a cam rotatably received in said second opening, said cam having a predetermined outer periphery to define a second surface, said second surface engaging said first surface when said cam is rotated to said locked position, said second surface disengaging said first surface when said cam is rotated to said unlocked position.

3. A coordinate measuring arm as claimed in claim 2, wherein said cam is generally cylindrically shaped.

4. A coordinate measuring arm as claimed in claim 2, wherein said first surface is generally concave.

5. A coordinate measuring arm as claimed in claim 2, further comprising:

a key; and wherein, said cam further comprises opposed ends, one of said ends being inward of the other and having a groove thereon; and said housing further includes a third opening communicating with said second opening, said key being received in said third opening for engaging said groove to position said cam in said second opening.

6. A coordinate measuring arm as claimed in claim 2, wherein:

said cam further comprises opposed ends, one of said ends being outward of the other and having an opening therethrough to receptive to a tool.

7. A coordinate measuring arm as claimed in claim 2, wherein said cam further includes a concave surface matable with said first locking device.

8. A coordinate measuring arm as claimed in claim 2, wherein said first surface comprises two intersecting concave surfaces.

9. A coordinate measuring arm as claimed in claim 1, further comprising:

a first housing mountable to said second end of said arm;

a second housing mountable to the support; and wherein said first locking device is disposed on said first housing and comprises a female tapered portion; and said second locking device is disposed on said second housing and comprises a male tapered portion matable to said female tapered portion.

* * * * *